(12) United States Patent
Kitajima et al.

(10) Patent No.: US 6,643,906 B2
(45) Date of Patent: Nov. 11, 2003

(54) FRICTION MEMBER, AND VIBRATION WAVE DEVICE AND APPARATUS USING FRICTION MEMBER

(75) Inventors: Satoru Kitajima, Kawasaki (JP); Yutaka Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,291

(22) Filed: Dec. 8, 1999

(65) Prior Publication Data

US 2003/0041435 A1 Mar. 6, 2003

(30) Foreign Application Priority Data

Dec. 9, 1998 (JP) .......................... 10-349560
Dec. 9, 1998 (JP) .......................... 10-349561

(51) Int. Cl.[7] .............................. B23P 17/00
(52) U.S. Cl. ................. 29/419.1; 29/527.6; 29/594; 264/127; 264/108; 264/162
(58) Field of Search ................ 29/594, 25.35, 29/609.1, 419.1, 417, 527.3, 527.6; 310/323.11; 264/127, 108, 162

(56) References Cited

U.S. PATENT DOCUMENTS

| | | | |
|---|---|---|---|
| 1,701,889 A | * 2/1929 | Junker ......................... | 29/417 |
| 3,254,189 A | * 5/1966 | Evanicsko et al. .......... | 29/419.1 |
| 3,729,794 A | * 5/1973 | Douglass ..................... | 29/419.1 |
| 4,521,360 A | * 6/1985 | Fiorentino .................. | 264/108 |
| 4,707,314 A | * 11/1987 | Kawahigashi et al. ...... | 264/348 |
| 5,352,950 A | * 10/1994 | Shirasaki ................... | 310/323.11 |
| 5,594,291 A | 1/1997 | Tamai et al. .................. | 310/323 |
| 5,698,929 A | 12/1997 | Seki et al. .................... | 310/323 |
| 5,770,916 A | 6/1998 | Ezaki et al. .................. | 310/366 |
| 5,846,356 A | * 12/1998 | Vyakarnam et al. ........ | 264/108 |
| 5,849,125 A | * 12/1998 | Clark .......................... | 29/25.35 |
| 5,917,269 A | 6/1999 | Maruyama et al. .......... | 310/323 |
| 6,046,526 A | 4/2000 | Maruyama ................. | 310/323.06 |
| 6,051,911 A | 4/2000 | Kojima et al. ............... | 310/323 |

FOREIGN PATENT DOCUMENTS

| JP | 57148559 A1 * | 9/1982 |
|---|---|---|
| JP | 1-129781 | 5/1989 |
| JP | 1-206880 | 8/1989 |

* cited by examiner

Primary Examiner—Gregory Vidovich
Assistant Examiner—Jermie E. Cozart
(74) Attorney, Agent, or Firm—Fitzpatrick, Cella, Harper & Scinto

(57) ABSTRACT

In a method of manufacturing a friction member used for a vibration wave driving apparatus including a vibration member, a contact member which is brought into frictional contact with the vibration member and relatively moved by vibrations produced in the vibration member, and the friction member formed on one of friction portions of the vibration member and contact member, a molded member is formed by compression molding of a plastic powder and an additive, a sintered member is formed by sintering the molded member, a sheet is formed by cutting the sintered member in the form of a sheet, and a modified layer formed by cutting is removed from the friction surface of the sheet.

8 Claims, 8 Drawing Sheets

RELATION BETWEEN LENGTH OF CARBON FIBER AND ABRASION LOSS

RELATION BETWEEN SPECIFIC GRAVITY AND ABRASION LOSS

FRICTION MEMBER, AND VIBRATION WAVE DEVICE AND APPARATUS USING FRICTION MEMBER

BACKGROUND OF THE INVENTION

1. Field of the Invention

The present invention relates to a friction member for a vibration wave driving device, a vibration wave driving device, and an apparatus using the vibration wave driving device as a driving source.

2. Related Background Art

In general, a vibration wave motor is designed to produce circular or elliptic motion at each point on the surface of a vibration member and to fictionally drive a contact member pressed against the vibration member.

The principle of a vibration wave motor using traveling vibration waves will be briefly described below. A vibration member (stator) is formed by bonding two groups of piezoelectric elements arranged in the circumferential direction to one surface of a ring-like elastic member formed by using an elastic material such as a metal whose total length is an integer multiple of a given length $\lambda$.

The piezoelectric elements of each group are arranged at a pitch of $\lambda/2$ to alternately have opposite expansion/contraction polarities. The two groups have a shift of an odd integer multiple of $\lambda/4$. Electrode films are respectively formed on the two groups of piezoelectric elements.

When an alternative voltage is applied to one group (to be referred to as an A phase hereinafter), the vibration member produces standing waves (wavelength $\lambda$) as bending vibrations throughout the elastic member such that the middle point of each piezoelectric element of the A phase and points $\lambda/2$ from the central point correspond to the positions of antinodes, and the middle points between the antinodes correspond to the positions of nodes.

When an alternative voltage is applied to only the other group (to be referred to as a B phase hereinafter), standing waves are produced as in the above case, but the positions of antinodes and nodes shift from those of the standing waves produced by the A phase by $\lambda/4$.

When alternating signals having the same frequency and a temporal phase difference of 90° are simultaneously applied to the A and B phases, standing waves produced by the two phases are synthesized to produce traveling waves (wavelength $\lambda$) as bending vibrations which propagate in the circumferential direction of the elastic member. At this time, elliptic motion is produced at each point on the surface of the elastic member having a thickness.

If, therefore, a ring-like contact member (e.g., a rotor as a moving member) is directly pressed and brought into contact with one surface of the vibration member, the contact member receives a frictional force in the circumferential direction from the vibration member driven to rotate.

Various materials have been proposed as friction members for vibration wave motors. As a material having the above characteristics, for example, a composite material of fluoroplastic and reinforcing fiber or a polymeric material is disclosed in Japanese Patent Application Laid-Open Nos. 1-129781 and 1-206880. This material is disclosed as a material suited to a friction material for a vibration wave motor because it has a good abrasion resistance, long service life, and stable friction coefficient.

As a method of manufacturing such a fluoroplastic composite material, a method using compression molding is generally known. In this method, a fluoroplastic powder and additive are homogeneously mixed, and the mixture is charged into a mold. The mixture is generally molded into a cylindrical molded member. The molded member is sintered at a temperature equal to or higher than the melting point of fluoroplastic. The outer surface of the sintered member is cut as if it were peeled like toilet paper, thereby obtaining a sheet-like composite material. After the material is formed into a sheet, the sheet is blanked in an appropriate size. The resultant structure is bonded as a friction member to a vibration member or contact member.

When, however, the above sheet-like fluoroplastic composite material was used as a friction member for a vibration wave motor, and the motor was driven, an abnormally large abrasion loss was produced on the surface of the friction member or the bonded friction member peeled off during driving of the vibration wave motor.

SUMMARY OF THE INVENTION

According to one aspect of the invention, as a friction member used for a vibration wave driving apparatus, a friction member ensuring excellent abrasion properties for the vibration wave driving apparatus is provided, which is formed by forming a molded member mainly made of plastic by compression molding of a plastic powder and an additive, forming a sintered member by sintering the molded member, forming a sheet by cutting the sintered member in the form of a sheet, and removing a modified layer from a surface of the sheet, which is produced by cutting.

According to one aspect of the present invention, as a friction member used for a vibration wave driving apparatus, a friction member ensuring excellent abrasion properties for the vibration wave driving apparatus is provided, which is formed by forming a molded member mainly made of plastic by compression molding of a plastic powder and an additive, and sintering the molded member, the fiber member being aligned substantially perpendicular to a friction surface and having a specific gravity of not less than 80% of a theoretical specific gravity.

Other features and advantages of the present invention will be apparent from the following detailed description.

DETAILED DESCRIPTION OF THE PREFERRED EMBODIMENTS

Figure 1A:
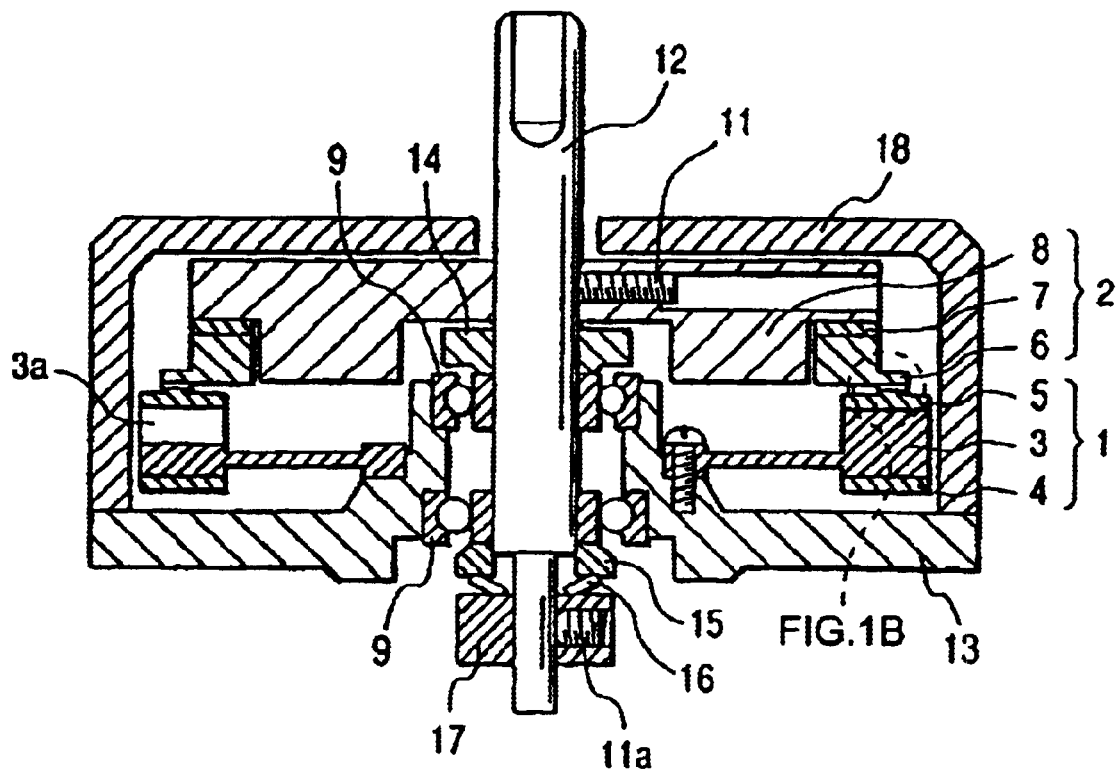
FIGS. 1A and 1B are a sectional view of a vibration wave motor, and an enlarged cross-section of a sliding contact interface of the vibration wave motor, respectively, according to first embodiment of the present invention.
Figure 1B:
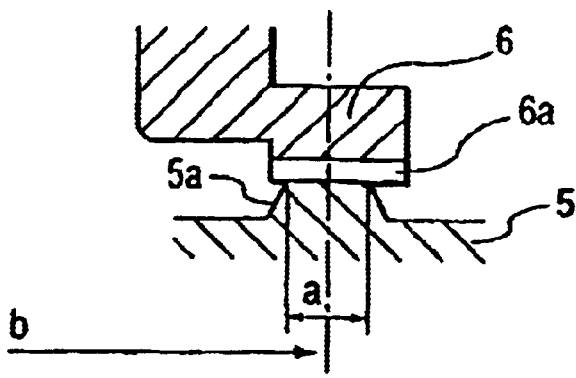

FIG. 1 is a sectional view showing a vibration wave motor according to an embodiment of the present invention. Referring to FIG. 1, a vibration member 1 has a ring-like elastic metal member 3 made of stainless steel. Two groups of polarized piezoelectric members 4 arranged in the form of rings in the above-described manner are bonded to one end face of the elastic metal member 3 with an epoxy-resin-based adhesive. A friction member 5 is bonded to the other end face of the elastic metal member 3 in the same manner.

A friction member 6a is formed on the friction/slide surface of a ring-like contact member 6 made of an aluminum alloy which is located on the moving member 2 side. The contact member 6 is mounted on a support member 8 through a rubber ring 7. The support member 8 is fixed to an output shaft 12 with a screw 11. The friction member 5 of the vibration member 1 comes into contact with the friction member 6a of the contact member 6 to form a friction/slide surface, which is pressurized by a pressurizing leaf spring 16 in the axial direction with a total load of 5 kgf. This motor also has a bearing 9, a plate 13 for fixing the vibration member 1, pressurizing collars 14 and 15, a collar 17 fixed to the output shaft 12 with a screw 11a, and a cover 18.

A convex portion 5a is formed as a circumferential step on the sheet-like friction member 5 by machining. A width a and a diameter b of the contact portion (friction surface) between the friction members 5 and 6a in FIG. 1 are 0,8 mm and 30 mm, respectively.

When an alternative voltage having a given frequency is applied to the two groups of piezoelectric members 4, which are alternately polarized in the thickness direction and formed on the vibration member 1, traveling vibration waves are produced in the vibration member 1 by the synthetic vibrations of two types of standing waves. As a consequence, a frictional force acts on the friction member 6a through the friction member 5, and the moving member 2 as a contact member rotates.

The friction member of the present invention may be used for one or both of the friction members 5 and 6a. If the friction member of the present invention is used for one friction member, a general friction member can be used for the other friction member. As general friction members, an aluminum-silicon alloy, hardened steel, ceramics, superhard alloy, and the like are available, which are hard and tough and almost free from abrasion. In this embodiment, a fluoroplastic composite material was used for the friction member 5, and a ceramic material (alumina) was used for the friction member 6a.

The present invention will be described in detail below by presenting embodiments and comparing them with the problems in the prior art.

(First Embodiment)

A friction member was manufactured in the following manner.

Figure 2:
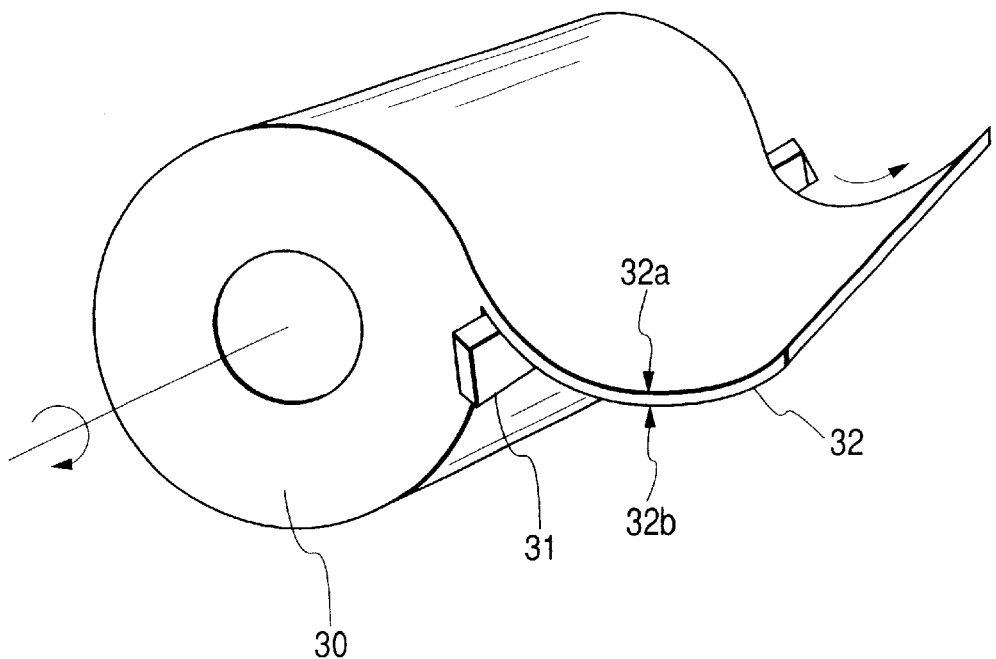
FIG. 2 is a perspective view showing a method of manufacturing a friction member according to first embodiment.

A material powder consisting of 20 wt % of carbon fiber (OSAKA GAS CO. LTD., trade name: SG-249) and 4 wt % of polyimide powder (Ube Industries, Ltd., trade name: UIP-S) was homogeneously mixed into 76 wt % of fluoroplastic powder (polytetrafluoroethylene: PTFE, DAIKIN INDUSTRIES. LTD., trade name: polyfron M-12) by using a Henschel mixer. The mixture was then charged into a mold and uniformly pressed by a press at a pressure of 500 kg/cm$^2$ to be compression-molded, thereby forming a cylindrical molded member having an outer diameter of 20 cm, an inner diameter of 5 cm, and a length of 12 cm. Thereafter, the resultant structure was sintered at 380° C. for three hours to obtain a sintered member 30. As shown in FIG. 2, a superhard cutting blade 31 having a width of 15 cm was brought into contact with the outer surface of the sintered member 30 while the sintered member 30 was rotated by a lathe. The sintered member 30 was cut to a thickness of 0.5 mm by using an apparatus designed to synchronize the rotation of the sintered member 30 with the movement of the blade toward the center of the sintered member 30, thereby cutting out a sheet 32 as if to peel it off from the outer surface of the sintered member 30.

The sheet 32 was blanked in a ring-like form to obtain a friction member 5 in FIG. 1 by using a cutting die in which a Thomson blade was embedded and a press. The blanked member was bonded to an elastic metal member 3. Since the surface of the sheet was mainly made of fluoroplastic, the surface was chemically decomposed with a finishing agent to improve the adhesive property before bonding. Without such a surface treatment, the peeling strength based on bonding is as low as ⅕ to ⅒. That is, a surface treatment is indispensable to increase adhesive strength.

As described in "Description of the Related Art", the friction member manufactured in the above manner sometimes partly peeled off while the vibration wave motor was driven. Upon examination of the cause of this trouble, the following problem was found.

Figure 3A:
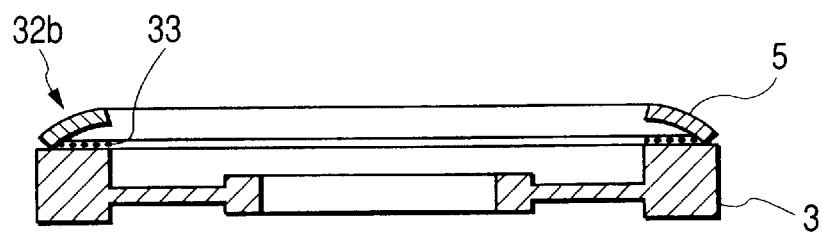
FIGS. 3A and 3B are views showing how the friction member according to first embodiment is bonded to an elastic metal member.
Figure 3B:
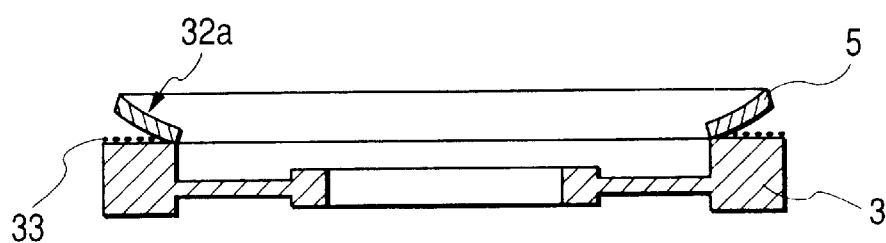

The sheet 32 is mechanically distorted and thermally affected by the cutting process. As shown in FIG. 2 as well, after the cutting process, the sheet 32 curls (curves) in the longitudinal direction to form a concave surface 32a and convex surface 32b on the two surfaces of the sheet 32. This curl does not disappear even if the sheet 32 is left to stand. As shown in FIGS. 3A and 3B, the friction member 5 blanked from this sheet 32 is placed on the adhesive surface of the elastic metal member 3 which is coated in advance with an epoxy-based two-part adhesive 33. A flat plate is then kept pressed down against the upper surface of the friction member 5 until the adhesive hardens, thereby bonding the friction member 5 to the adhesive surface. As shown in FIG. 3A, when the friction member 5 is bonded with its concave surface serving as an adhesive surface, the curled friction member 5 comes into contact with the adhesive surface of the elastic metal member 3 from its outer peripheral side. As the sheet is pressed further, its inner peripheral side is directly pressurized from above while the outer peripheral side scarcely moves. Therefore, bubbles easily form in the adhesive layer made of the adhesive 33 or its thickness is likely to vary.

As shown in FIG. 3B, therefore, when the sheet was bonded with its convex surface of the curl serving as an adhesive surface, the curled sheet came into contact with the adhesive surface from its inner peripheral side. As the sheet was pressed further, the sheet gradually came into contact with the outer peripheral side. In this manner, the sheet was bonded to the adhesive surface while the excess portion of the adhesive 33 and bubbles were pushed outside. This process did not easily produce bubbles.

The frequency with which the friction member manufactured in this manner peeled off while the motor was driven noticeably decreased. Note that the convex portion 5a of the friction member 5 is formed by cutting a portion other than the convex portion 5a after the friction member 5 is bonded to the elastic metal member 3. Although the formation of this convex portion facilitates letting out an abrasion powder, the convex portion need not be formed depending on the specifications of the motor.

As described in "Description of the Related Art", since the friction member was often abraded to a large extent in the early stages of driving of the motor, this abnormal phenomenon was examined. Large abrasion progresses at a rate of 0.3 to 5 µm/h, which is 50 to 100 times the general abrasion rate of a motor during driving, which is 0.05 to 0.08 µm/h, and hence the performance (the rpm and torque) of the motor becomes unstable. Upon observation on the surface and cross-section of a sheet having undergone a cutting process, such abrasion apparently occurred due to the influences of the modified layer produced by the cutting process. Carbon fibers on the upper surface of the sheet break or come off owing to the cutting resistance in the cutting process or the heat generated by the cutting resistance. Likewise, the polyimide powder is partly lost or damaged. The degree of modification is especially high on the relief surface side of the cutting blade in the cutting process (corresponding to the concave surface side of the curl). In the modified layer, modification has occurred in fluoroplastic as well as in the carbon fibers due to recesses/projections or minute cracks on the surface or heat.

Figure 4:
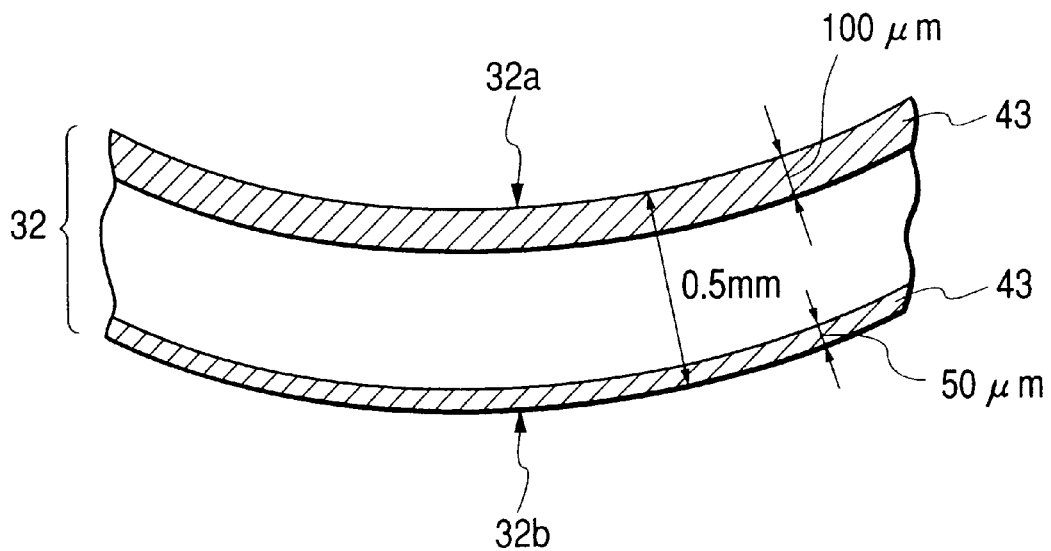
FIG. 4 is a view showing the modified layers of the friction member according to first embodiment.

As shown in FIG. 4, provided that the thickness of the sheet is 0.5 mm, such modified surfaces 43 reach a thickness of at least about 50 µm on the convex surface side of the curl, and a thickness of at least about 100 µm on the concave surface side of the curl. This modified layer was removed in advance from the surface of the friction member 5 or convex portion 5a in FIG. 1, after the sheet was bonded to the elastic metal member, by a process method with a low cutting resistance and a small amount of heat generated, e.g., grinding the surface using a grinding wheel containing diamond particles under cooling, or lapping the surface using a lapping sheet, thereby forming the surface of the friction member 5 in FIG. 1 into a good friction surface. When the vibration wave motor having this friction surface was evaluated, abrasion was stable from the early stages of driving, and the performance of the motor was also stable.

As is obvious from this, in consideration of the result of observation on the surface and cross-section of the sheet, the modified layer tends to cause a large amount of abrasion in a short period of time in the early stags of driving, and a large amount of abrasion powder produced in the early stages of driving accelerates abrasion of the resin member underneath the modified layer. In order to prevent an abnormally large amount of abrasion, it is essential that the friction surface be a good surface without any modified layer in the early stages of driving.

As described above, to practically use a sheet-like member formed by molding, sintering, cutting a powder mainly made of fluoroplastic for a friction member of a vibration wave motor, a modified layer like the one described above must be removed.

The friction member used in the present invention is made of a fluoroplastic powder mainly consisting of fluoroplastic and containing other additives. As other additives, powders made of heat-resistant polymeric materials are preferably used. For example, such additives are polyimide resin, polyamide resin, polyetheretherketone resin, polyphenylenesulfide resin, silicone resin, polyparaoxybenzoyl resin, epoxy resin, phenolic resin, polycarbonate resin, polyphenyleneoxide resin, and the like. Of these resins, polyimide resin having the highest heat resistance is preferable. These resins have high abrasion resistance and stable friction and abrasion properties, and hence are optimal as friction members of a vibration wave motor.

If inorganic and organic fibers are added as reinforcing materials, other than the above heat-resistance polymeric materials, to the friction member, the friction member can acquire higher abrasion resistance and stabler friction and abrasion properties. Of these fibers, a carbon fiber as an inorganic fiber is most preferable because it has a stable friction coefficient and cause little abrasion.

In addition to the above fluoroplastic, heat-resistant polymeric materials, and fibers, other materials are preferably added to the friction member used in the present invention, as needed. As inorganic powders, molybdenum sulfide, a solid lubricant such as a carbon powder, an alumina powder, a silicon oxide powder, and the like are available. The properties of friction members can be changed in accordance with various specifications of vibration wave motors by adding these materials to the friction members.

The ratio of fluoroplastic that can be used for compression molding is 50 wt % or more, and preferably 70 to 90 wt %.

The ratio of other additives is 50 wt % or less, and preferably 2 to 10 wt %. If the ratio of other additives exceeds 50 wt %, the material becomes brittle and decreases in strength. This is because, in compression molding, fluoroplastic serves as a binder, and a reduction in the amount of fluoroplastic decreases the binding force for the additives. For this reason, if the ratio of fluoroplastic is low (the ratio of additives is high), the thickness of the modified layer due to a cutting process increases.

As described above, according to the present invention, the modified layer on the friction contact surface of a sheet member formed by compression molding using a mixture of fluoroplastic and other additives is removed, and the resultant structure is used as a friction member that comes into frictional contact with at least one of the vibration member or contact member of the vibration wave motor. In addition, the convex surface of the curl of the sheet is bonded to the vibration member or contact member. Therefore, the vibration wave motor can be stably driven without the friction member peeling off from the adhesive surface during driving and an abnormally large amount of abrasion. In addition, the service life of the vibration wave motor can be prolonged, and hence the reliability of the motor can be further improved.

Figure 5:
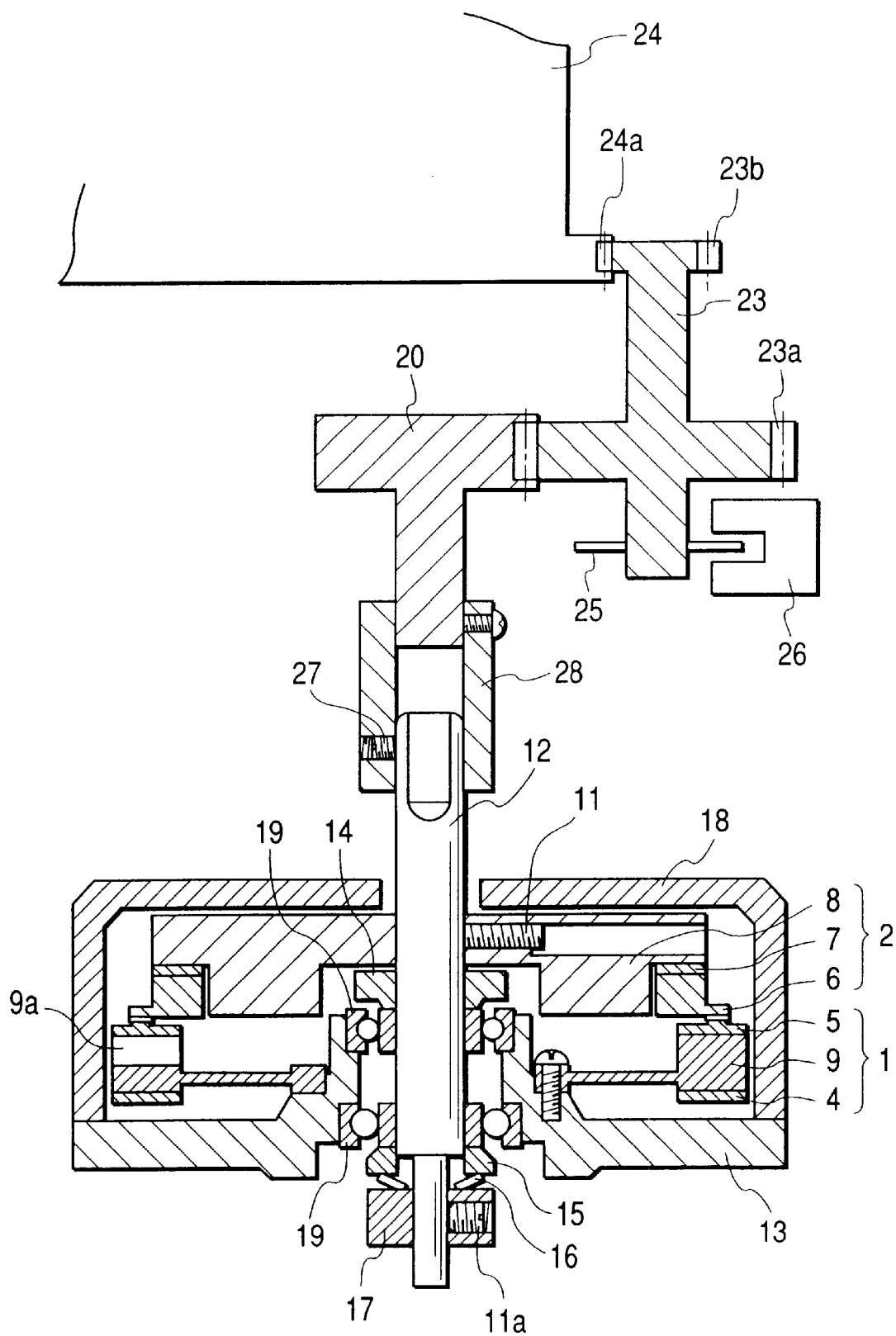
FIG. 5 is a schematic view showing an apparatus using the vibration wave motor in FIG. 1A as a driving source.

The present invention can be applied to various apparatuses each using the vibration wave motor with the above friction member as a driving source, as shown in FIG. 5.

FIG. 5 is a schematic view of the apparatus using the vibration wave motor in FIG. 1 as a driving source.

The driving force of the motor is transmitted from the output shaft 12 to a gear 20 through a coupling 28 fixed with a screw 27. A gear 23 has a wheel 23a and pinion 23b. The wheel 23a meshes with the gear 20 on the vibration wave motor side. The pinion 23b of the gear 23 meshes with a gear 24a formed on the outer surface of a driven member 24, e.g., a lens barrel. The driven member 24 is rotated by the driving force of the motor. An encoder slit plate 25 is mounted on the gear 23. The rotation of the gear 23 is detected by a photocoupler 26 to control the rotation of the motor for, e.g., autofocus operation.

For example, the apparatuses to which the present invention can be applied are optical equipment such as cameras, office equipment such as printers and copying machines, and apparatuses associated with automobiles such as power windows and active suspensions.

As described above, according to the above example, a composite material mainly made of fluoroplastic is compression-molded and sintered, and the sintered member is cut into a sheet-like member. This member is used as a friction member of a vibration wave motor. In this manner, friction members having high abrasion resistance can be provided in large quantities at a low cost, which do not peel off from the adhesive surface during driving of the motor and are free from an abnormally large amount of abrasion in the early stages of driving.

In addition, a vibration wave motor that has excellent abrasion property, can be driven stably, and has a long service life can be provided by using the friction member described above.

Furthermore, an apparatus using the above vibration wave motor with excellent abrasion property can be provided.

(Second Embodiment)

A friction member was manufactured in the following manner.

First of all, 20 wt % of carbon fiber (short fiber: chip fiber, diameter: about 13 $\mu$m, length: about 110 $\mu$m, OSAKA GAS CO. LTD., trade name: SG-249) was homogeneously mixed into 80 wt % of fluoroplastic powder (polytetrafluoroethylene: PTFE, DAIKIN INDUSTRIES. LTD., trade name: polyfron M-12) by using a Henschel mixer. The mixture was then charged into a cylindrical mold and uniformly pressed by a press at a pressure of 500 kg/cm$^2$ to be compression-molded, thereby forming a cylindrical molded member having an outer diameter of 20 cm, an inner diameter of 5 cm, and a length of 12 cm. Thereafter, the resultant structure was sintered at 380° C. for three hours to obtain a sintered member 30.

Figure 6:
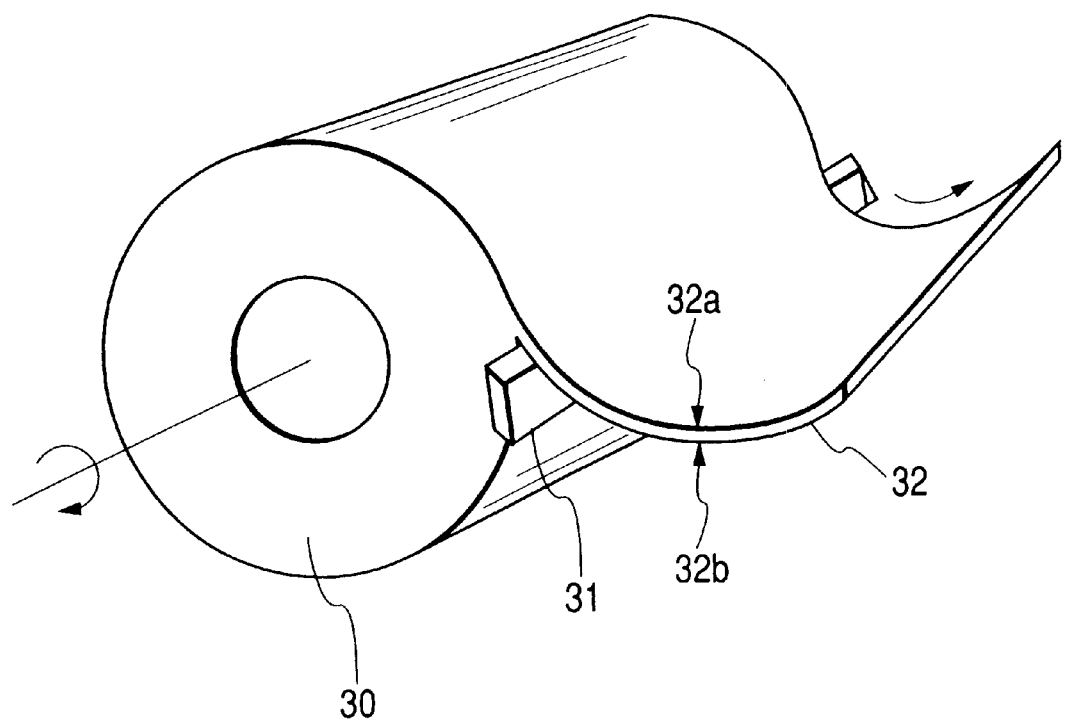
FIG. 6 is a perspective view for explaining a method of manufacturing a friction member according to second embodiment.

As shown in FIG. 6, a superhard cutting blade 31 having a width of 15 cm was brought into contact with the outer surface of the sintered member 30 while the sintered member 30 was rotated by a lathe. The sintered member 30 was cut to a thickness of 0.5 mm by using an apparatus designed to synchronize the rotation of the sintered member 30 with the movement of the blade toward the center of the sintered member 30, thereby cutting out a sheet 32 as if to peel it off from the outer surface of the sintered member 30. The sheet 32 was cut in the form of a belt, producing a curl (curve) due to the stress and heat in the cutting process with a curl concave surface 32a and curl convex surface 32b being formed on the two surfaces of the curl.

The sheet 32 was blanked in a ring-like form to obtain a friction member 5 in FIG. 1 by using a cutting die in which a Thomson blade was embedded and a press. The sheet 32 was bonded to an elastic metal member 3, and a convex portion 5a of the friction member 5 was formed by machining. Vibration wave motors each having this friction member 5 were actually driven and evaluated at a load of 300 g·cm and 300 rpm. When 10 vibration wave motors were evaluated, the abrasion loss of the friction member 5 was 5 to 8 $\mu$m/100 H.

The abrasion loss was obtained from the difference between the height of the convex portion 5a which was measured in advance and the height of the convex portion 5a which was measured after the evaluation. A friction member 6a was hardly abraded.

COMPARATIVE EXAMPLE 1

The same material as that in second embodiment was homogeneously mixed following the same procedure as in second embodiment. The mixture was then charged into a mold different in shape from the cylindrical mold in second embodiment and was uniformly pressed at 500 kg/cm$^2$ to be compression-molded, thereby forming a rodlike molded member having an outer diameter of 60 mm, an inner diameter of 10 mm, and a length of 12 cm. This member was sintered under the same conditions as those in second embodiment to obtain a sintered member.

The rodlike member obtained in this manner was mounted on a lathe and cut (sliced) into a thin disk-like member having a thickness of 0.5 mm by cutting it in the radial direction with a superhard knife-like blade while rotating the member. The resultant member was blanked in the form of a ring to obtain a friction member 5 by using the same cutting die and press as those in second embodiment. The obtained member was bonded, and a convex portion 5a of the friction member 5 was cut out in the same manner as in second embodiment. Vibration wave motors each having this friction member 5 were evaluated under the same conditions. When 10 vibration wave motors were evaluated, the abrasion loss of the friction member 5 was 22 to 35 $\mu$m/100 H.

Second embodiment and Comparative Example 1 will be described below.

The difference between the abrasion loss in second embodiment and that in Comparative Example 1 is probably ascribed to the difference between the alignment of carbon fibers contained in the fluoroplastic composite material in second embodiment and that in Comparative Example 1. When the behaviors of the carbon fibers of the friction surfaces were actually examined with a microscope over time during evaluation, in second embodiment almost half of the carbon fibers were aligned perpendicular to the friction surface, and only a minimum number of carbon fibers or short carbon fibers came off or moved owing to friction. In contrast to this, in Comparative Example 1, almost half of the carbon fibers aligned themselves parallel to the friction surface, and even relatively long carbon fibers of several 10 $\mu$m to 100 $\mu$m moved as if they were pushed along the moving direction of the contact member (rotor). In the worst case, all the carbon fibers came off. Since the above two friction members are obtained by molding and calcination under the same conditions and have the same specific gravity, about 2.0, the densities of the members are the same. Obviously, therefore, the difference in movement between the carbon fibers is ascribed to the difference in alignment between the carbon fibers.

Figure 7A:
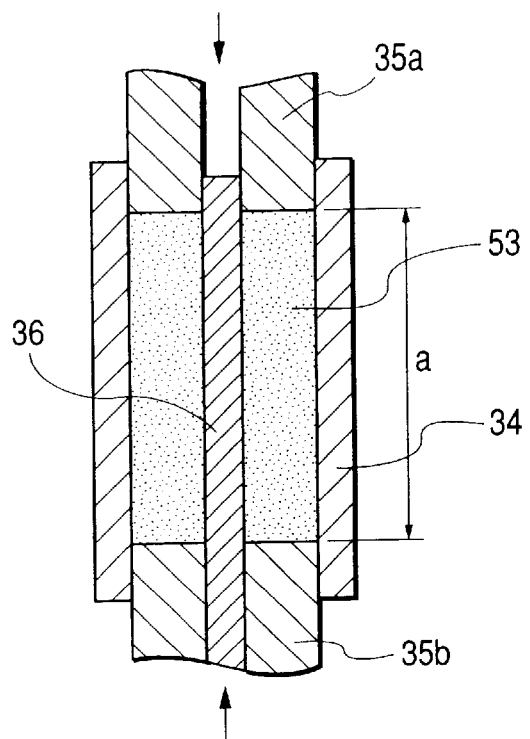
FIGS. 7A and 7B are views for explaining a method of compression-molding fluoroplastic and a fiber material.
Figure 7B:
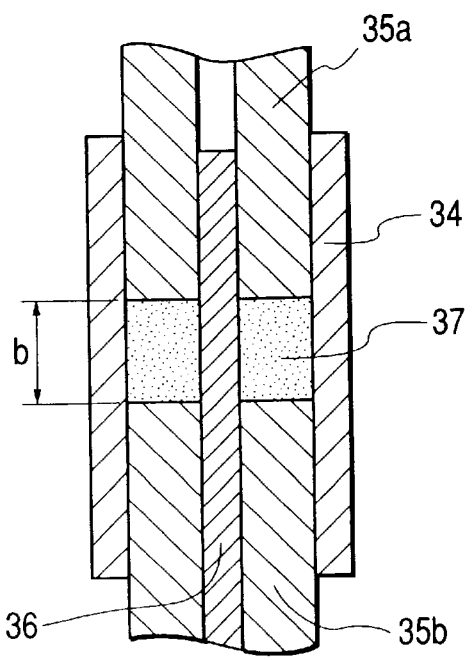

The reason why carbon fibers are aligned will be described in more detail below with reference to FIGS. 7A and 7B and 8A and 8B. Referring to FIGS. 7A and 7B, a powder mixture 53 obtained by mixing carbon fibers into a fluoroplastic powder is charged into a cylindrical mold 34 and pressed upward and downward (double axes) by two punches 35a and 35b to be compression-molded (although the powder may be pressed by a single-axis press, the double-axis press is used to make the molded member have a uniform density as much as possible). In this case, the mold 34 has a core 36 (see FIG. 7A). A molded member 37 obtained by pressurization becomes a hollow cylindrical member (see FIG. 7B).

In general, since a fluoroplastic powder has a low bulk density, a height b of the molded member 37 obtained by compression molding is ⅓ to ⅕ of a height a of the composite powder charged into the mold. That is, in the compression process, as the fluoroplastic powder is gradually and greatly compressed in the axial direction, the carbon fibers also move and rotate and align themselves more stably in terms of position, i.e., align themselves perpendicular to the compressing direction of the press, until the powder is finally compressed.

Figure 8A:
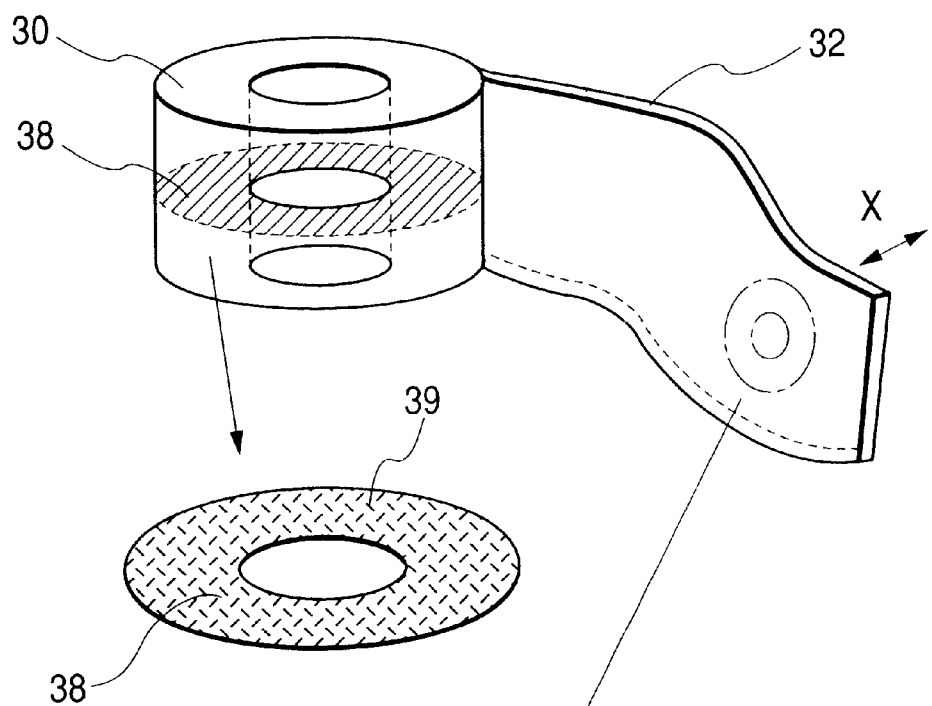
FIGS. 8A and 8B are views for explaining the principle of the occurrence of alignment of a fiber material.
Figure 8B:
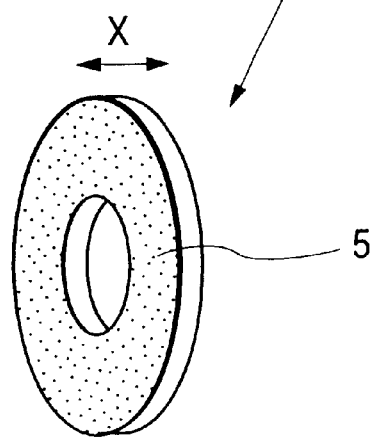

FIGS. 8A and 8B are schematic views of the sintered member 30 obtained by sintering the molded member 37.

Most of carbon fibers 39 on a given surface 38 inside the sintered member 30 obtained by sintering the molded member 37 in FIGS. 7A and 7B are parallel to the surface 38, i.e., lie horizontally (the directions of the fibers in the axial direction are random). When the outer surface of the sintered member 30 is cut into a sheet 32, the axial directions of about half of the carbon fibers 39 are theoretically parallel to a thickness direction X of the sheet 32 (strictly, about half of the carbon fibers fall within the range of ±45° with respect to the thickness direction of the sheet 32) (see FIG. 8A). The friction member 5 is blanked from the sheet 32 formed in this manner (see FIG. 8B).

As a result, in the friction member 5, about half of the carbon fibers 39 align themselves (have aligning properties) almost perpendicular to the friction surface (parallel to the surface of the sheet 32) of the friction member 5. In practice, some carbon fibers may make certain angle with a surface perpendicular to the compressing direction of the press. However, about 70 to 80% of the carbon fibers look perpendicular to the friction surface of the friction member 5.

(Third Embodiment)

Figure 9:
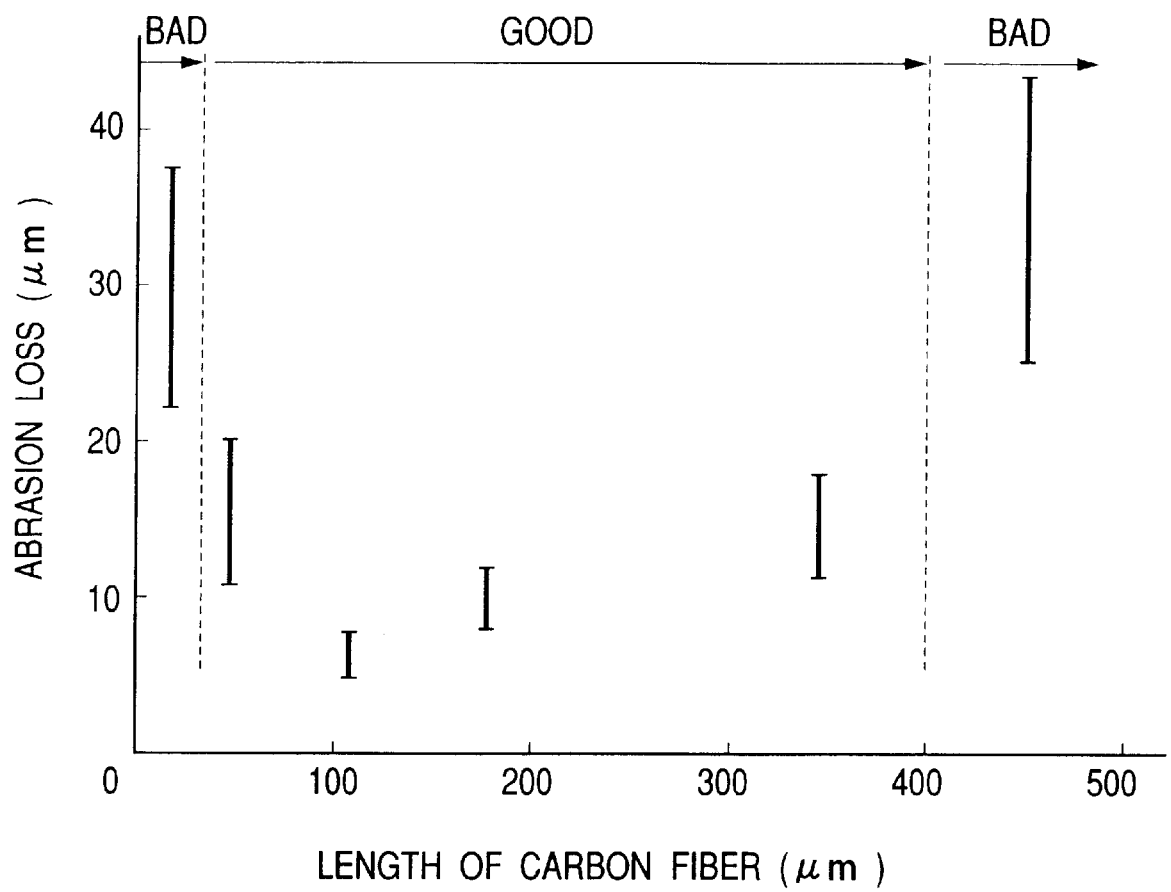
FIG. 9 is a graph showing the relation between the length of carbon fibers and the abrasion loss.

Friction members 5 were formed under the same conditions as those in second embodiment while only the average length of carbon fibers was changed to 20 μm, 50 μm, 180 μm, 350 μm, and 450 μm. Each friction member was then evaluated with a vibration wave motor. FIG. 9 shows the relation between the length of carbon fiber and the abrasion loss.

With the carbon fibers having an average length of 450 μm, a friction member having many cavities in a fluoroplastic portion was obtained for the following reason. Since the carbon fibers were long, the fluoroplastic powder and the carbon fibers did not mix well, and the carbon fibers could not be homogeneously dispersed. The specific gravity of the resultant structure was 1.6. Note that the theoretical specific gravity of a mixture of a fluoroplastic powder and carbon fibers is 2.07 (to be described later).

With the carbon fibers having average lengths of 350 μm and 180 μm, the abrasion property of each friction member 5 was slightly inferior to that of the friction member in first embodiment, but was almost good. Each friction member had a specific gravity of 1.9.

As is obvious from this result, to obtain a good abrasion property, it is not adequate to use very long carbon fibers. With the carbon fibers having an average length of 20 μm, the friction member had a specific gravity of 2.0, but carbon fibers easily came off and hence the abrasion loss was large. With the carbon fibers having an average length of 50 μm, the friction member had the same specific gravity, 2.0, but carbon fibers easily came off and hence the abrasion loss was slightly large. In consideration of the above results, the average length of carbon fibers was preferably about 50 μm to 350 μm.

In this case, the thickness of a fiber was 13 μm. However, the same result as that described above could be obtained even if the thickness was about several μm to 20 μm.

(Fourth Embodiment)

A friction member was formed from a sheet member under the same conditions as those in second embodiment while only the pressure after the material was charged into the mold was changed, and the friction member was evaluated.

Figure 10:
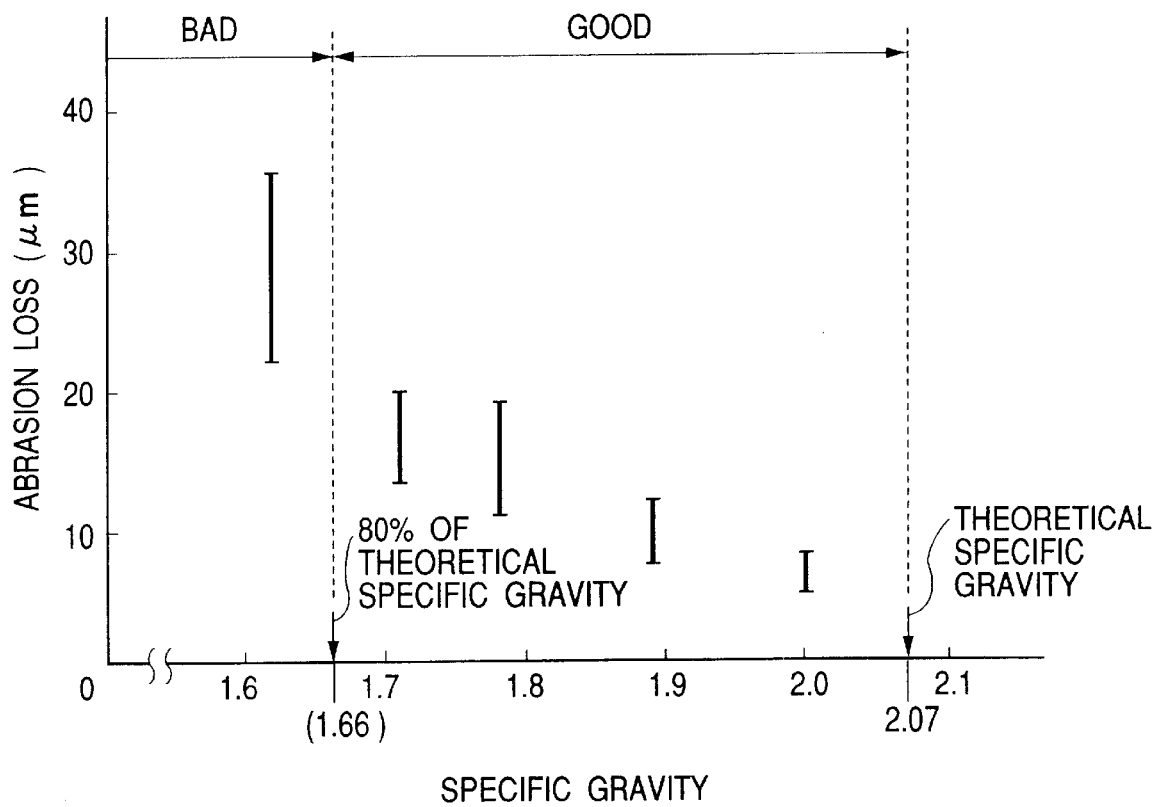
FIG. 10 is a graph showing the relation between the specific gravity and the abrasion loss.

The specific gravity of the fluoroplastic composite material could be changed by changing the pressure in compression molding. FIG. 10 shows the relation between the specific gravity and the abrasion loss of each friction member.

As is apparent from this relation, when the specific gravity is 80% or less of the theoretical specific gravity, the abrasion loss is large, and hence the material is not adequate as a friction member. In addition, this result indicates that the abrasion resistance of a friction member is associated with the specific gravity, as well as the above alignment of carbon fibers, i.e., the manner in which carbon fibers are densely buried in a fluoroplastic powder so as not to easily come off.

Note that the theoretical specific gravity was calculated as follows. The true specific gravities of the fluoroplastic powder and carbon fibers were 2.18 and 1.64, respectively, and the mixing ratio was 80:20. Therefore, theoretical specific gravity=(2.18×80+1.64×20)/100=2.07 [g/cm$^3$].

In each embodiment described above, carbon fibers are used as a fiber material. However, the same result associated with alignment as described above can be obtained by using other fiber materials, e.g., Kevlar fibers as a polymeric material and alumina fibers as an inorganic material. However, carbon fibers exhibit the lowest abrasion loss and have a stable friction coefficient, and hence are optimal to a vibration wave motor.

In each embodiment described above, the fluoroplastic composite material obtained by mixing carbon fibers into a fluoroplastic powder has been described. However, other additives may be added to this material. For example, the properties of the friction material can be improved by adding a polyimide powder, which is readily available and has a good heat resistance property with which an improvement in abrasion resistance can be expected, or a molybdenum sulfide powder, which exhibits a lubricating property even in a vacuum or at a high temperature.

In the present invention, the composition ratio of a fluoroplastic powder and a fiber material is set such that the fluoroplastic powder is 60 to 98 wt %, and preferably 70 to 95 wt %, and the fiber material is 2 to 40 wt %, and preferably 5 to 30 wt %. Since the abrasion loss is 20 μm or less in this range under the evaluation conditions in second embodiment, the above composition ratio is preferable.

The present invention can be applied to various apparatuses each using the vibration wave motor with the above friction member according to each of second to fourth embodiment as a driving source, as shown in FIG. 5.

According to each of second to fourth embodiment, a fluoroplastic composite member having a specific gravity of 80% or more of the theoretical specific gravity is obtained by compression-molding a fiber material mainly consisting of fluoroplastic and sintering the molded member. The cylindrical or columnar outer surface of this composite member is then cut in the form of a sheet by a cutting process. This sheet-like member is used as a friction member of a vibration wave motor. This makes it possible to obtain a large quantity of friction members having excellent abrasion resistance at a very low cost.

In addition, in the above manufacturing method, various fiber materials and other additives can be selected considerably freely, and friction members suited to vibration wave motors used in various applications can be easily manufactured. That is, this method is useful for practical applications and development of applications of vibration wave motors.

Furthermore, a vibration wave motor having excellent abrasion properties, are capable of stable driving, and having a long service life can be provided, together with an apparatus using the motor, by using the above friction members.

What is claimed is:

1. A method of manufacturing a friction member used for a vibration wave driving apparatus, comprising the steps of:

compression molding a plastic powder and an additive to form a molded member;

sintering the molded member to form a sintered member;

cutting the sintered member in the form of a sheet, thereby forming a sheet having a modified surface layer; and removing the modified surface layer from a friction surface of the sheet formed by said cutting step.

2. A method according to claim 1, wherein a concave surface of a curl produced in the cutting step is used as the friction surface.

3. A method according to claim 1, wherein a powder or fiber is used as the additive.

4. A method according to claim 1, wherein the plastic powder is a fluoroplastic powder.

5. A method of manufacturing a friction member used for a vibration wave driving apparatus including a vibration member, a contact member which is brought into frictional contact with the vibration member and relatively moved by vibrations produced in the vibration member, the friction member being formed on one of respective friction portions of said vibration member and contact member, the method comprising the steps of:

compression molding a plastic powder and an additive to form a molded member;

sintering the molded member to form a sintered member;

cutting the sintered member in the form of a sheet, thereby forming a sheet having a modified surface layer; and removing the modified surface layer from a friction surface of said sheet formed by said cutting step.

6. A method according to claim 5, wherein a concave surface of a curl produced in the cutting step is used as the friction surface.

7. A method according to claim 5, wherein a powder or fiber is used as the additive.

8. A method according to claim 5, wherein the plastic powder is a fluoroplastic powder.

* * * * *

UNITED STATES PATENT AND TRADEMARK OFFICE
CERTIFICATE OF CORRECTION

PATENT NO. : 6,643,906 B2
DATED : November 11, 2003
INVENTOR(S) : Satoru Kitajima et al.

It is certified that error appears in the above-identified patent and that said Letters Patent is hereby corrected as shown below:

Title page,
Item [56], References Cited, FOREIGN PATENT DOCUMENTS, "5748559 A1*" should read -- 57-148559 A1* --.

Column 1,
Line 15, "fictionally" should read -- frictionally --.

Column 3,
Line 33, "0,8mm" should read -- 0.8mm --.

Column 5,
Line 45, "stags" should read -- stages --.

Column 7,
Line 66, "rodlike" should read -- rod-like --.

Column 8,
Line 4, "rodlike" should read -- rod-like --.

Signed and Sealed this

Fifth Day of April, 2005

JON W. DUDAS
*Director of the United States Patent and Trademark Office*